United States Patent [19]
Besten

[11] Patent Number: 5,942,118
[45] Date of Patent: Aug. 24, 1999

[54] METHOD AND ARRANGEMENT FOR DECOMPOSING ORGANIC WASTE WATER POLLUTANTS

[76] Inventor: Hans-Werner Besten, Doinghauser Strasse 15, 58332 Schwelm, Germany

[21] Appl. No.: 08/943,113

[22] Filed: Oct. 3, 1997

[30] Foreign Application Priority Data

Oct. 4, 1996 [DE] Germany .................. 196 40 899

[51] Int. Cl.[6] .................................................. C02F 3/20
[52] U.S. Cl. .................... 210/610; 210/612; 210/614; 210/746; 210/96.1; 210/149; 210/178; 210/194
[58] Field of Search .................... 210/610, 612, 210/614, 607, 621, 631, 46.1, 143, 149, 178, 194, 205, 220, 743, 746

[56] References Cited

U.S. PATENT DOCUMENTS

| | | | |
|---|---|---|---|
| 4,425,231 | 1/1984 | Fujimoto et al. | 210/96.1 |
| 4,698,158 | 10/1987 | Fuji et al. | 210/614 |
| 5,268,092 | 12/1993 | Eden | 210/96.1 |
| 5,332,494 | 7/1994 | Eden et al. | 210/96.1 |
| 5,342,510 | 8/1994 | Eden et al. | 210/96.1 |
| 5,667,558 | 9/1997 | Bryan et al. | 210/96.1 |
| 5,733,456 | 3/1998 | Okey et al. | 210/96.1 |

*Primary Examiner*—Thomas G. Wyse
*Attorney, Agent, or Firm*—Dennison, Meserole, Scheiner & Schultz

[57] ABSTRACT

Highly concentrated waste water is subjected to a partially aerobic method in the reaction chamber of a vertical reactor (1). Aeration of the waste water is performed by regulating the redox potential. To this end, means (14) for measuring the pH value, on the one hand, and means (15) for measuring the redox potential value of the treated waste water, on the other hand, are arranged in a bypass line. The process computer acts via a regulator (31) on a regulating member (19) which regulates the supplied amount of air, and regulates the redox potential value according to the measured pH values in accordance with a predetermined relationship stored in a memory device (33). By means of regulating the redox potential by guiding the pH value, an essentially constant high rate of decomposition of 90% COD is achieved.

13 Claims, 2 Drawing Sheets

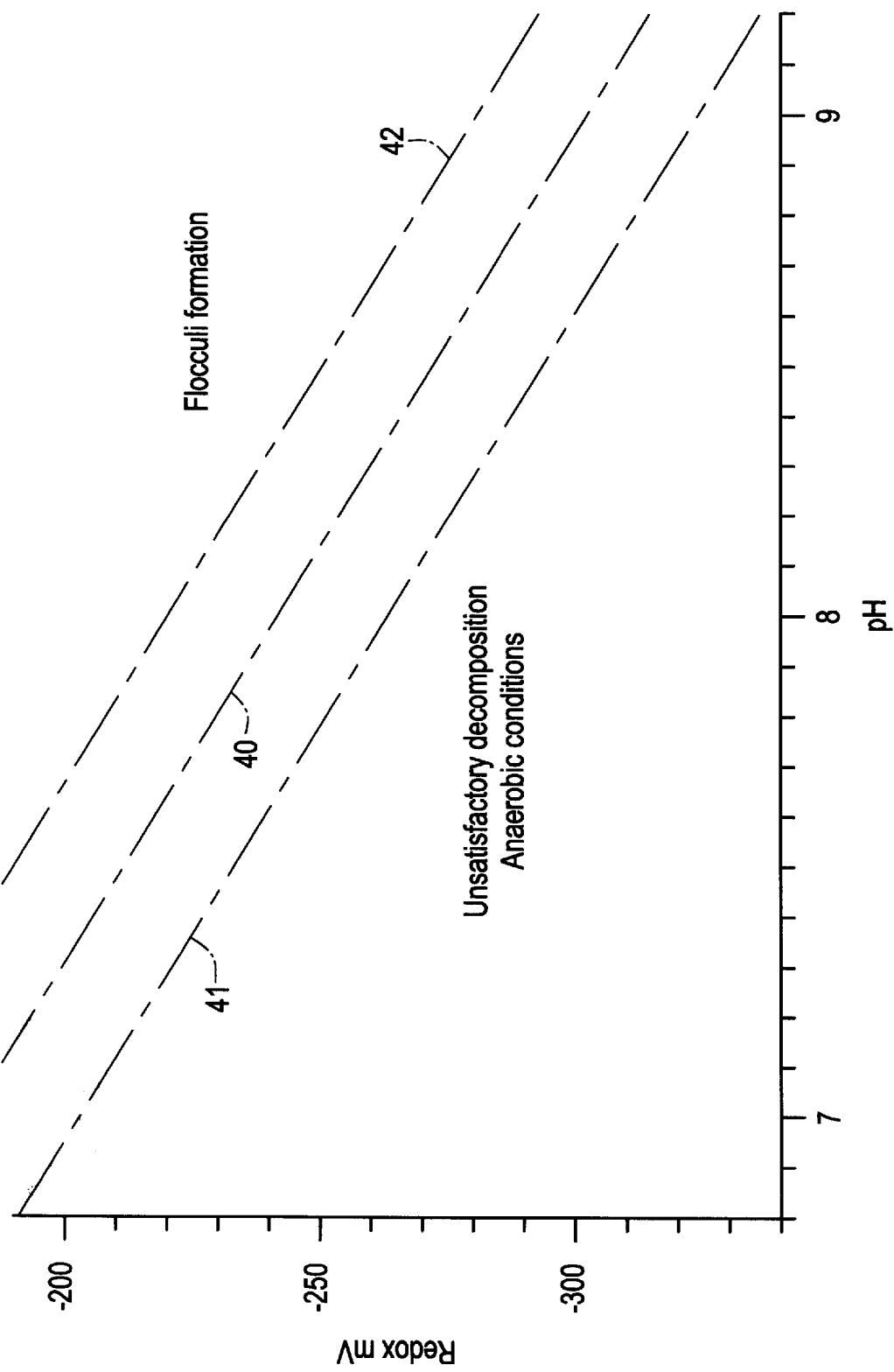

METHOD AND ARRANGEMENT FOR DECOMPOSING ORGANIC WASTE WATER POLLUTANTS

BACKGROUND OF THE INVENTION

The invention relates to a method and an arrangement for decomposing organic waste water pollutants by using freely suspended bacteria.

In the course of increased problems with drinking water and ground water, the treatment of waste water, in particular the decomposition of organic waste water pollutants, becomes more and more important. In the communal area, the waste water costs charged to the entity causing them were calculated in accordance with peak values of pollutants. Therefore large fluctuations in waste water concentrations lead to considerable increases in waste water costs. For reasons of costs, many industrial enterprises, in particular those with strong fluctuations in waste water concentrations, locate the purifying of waste water directly at the source of waste water generation. Communal treatment facilities can be relieved by this and waste water costs can be saved.

So-called partially aerobic methods have proven themselves in the decomposition of organic waste charges in high-concentration waste water, wherein aeration of the waste water and, if required, the addition of minimum materials to the waste water while regulating the redox potential takes place. It is known that under the conditions of the partially aerobic method the enzymes of the respiratory chain of the bacteria, or respectively the microorganisms are particularly active. Only a comparatively small portion of the pollutants is used for building the biomass. The preponderant portion of the pollutants is directly converted into carbon dioxide ($CO_2$) and water ($H_2O$). It is important that the supplied amount of air is metered in such a way that the bacteria can bring the redox potential of their medium into optimal and respiratory-active conditions. It was found that, with an increase in the redox potential by increasing the air supply, increased flocculation can occur.

Although a decrease of the redox potential below –300 mV decreases the danger of flocculation, it worsens the degree of the decomposition effects of the bacteria.

A partially aerobic method is known from DE-OS 32 27 488, wherein it is intended to set the redox potential to as constant as possible a value between –200 mV and –300 mV, and the pH value also essentially constant in the range between 7.0 and 9.0, preferably 8.0 to 8.1.

However, in actuality it has been shown that critical concentration fluctuations and above all changes in the pH values in the waste water could no longer be optimally regulated by means of the known partially aerobic method, and that the decomposition activity of the microorganisms is possibly reduced.

SUMMARY OF THE INVENTION

The object of the invention is based on improving the known partially aerobic method and the arrangement for executing it in such a way that an extremely high, possibly even optimal decomposition rate of the pollutants can be achieved without noticeable flocculation, even at large pH value fluctuations of the waste water.

To attain this object, the invention is based on the recognition that with fluctuating pH values the bacteria, or respectively the microorganisms, develop their full decomposition activities if a defined relationship between the redox potential values and the pH values is maintained. In other words, the redox potential and the pH value need not be maintained constant as long as their change is made in mutual interdependence.

Regarding the method, the attainment of the object on which the invention is based is distinguished in that a) redox potential values associated with different pH values, at which the pollutants are optimally biologically decomposed in the reactor, are determined;

b) a characteristic curve is formed from the determined values;

c) from the operationally measured pH values (actual pH values) and the characteristic curve values, a command value is formed in a process computer and is compared with operationally measured redox potential values (actual redox potential values), and d) the supplied amount of air is regulated as a function of the actual redox potential values by guiding the actual pH values.

The invention aids the microorganism culture by setting a balanced pH value at a relatively short time after large changes in pH value. A predetermined redox potential is associated with this pH value, which is set by regulating the amount of air supplied, i.e. of the atmospheric oxygen supplied.

As mentioned above, the pH value and the redox potential are matched with each other in such a way that the microorganisms encounter optimal living conditions in the reaction chamber and in the waste water. If, for example, the pH value drops to 6.9, the redox potential is regulated to a correspondingly changed value, for example –150 mV, by changing the atmospheric oxygen supplied. It was found that a redox potential, which is optimal for the activity of the microorganisms, is associated with each pH value. This characteristic curve of the pH value when associated with the corresponding redox potential can be predetermined without difficulty, stored and called out from the memory during regulation for forming the command value.

By means of the method in accordance with the invention, it is possible, even in case of relatively strongly fluctuating pH values, to regulate the amount of air supplied in such a way that no flocculation occurs. But a sufficient amount of atmospheric oxygen is made available in order to assure a sufficient energy output of the bacteria by way of their respiratory chain. In the process, the bacteria increase in such amounts that losses because of dilution by the addition of new waste water and by the removal of presettled solution are compensated. It is possible here to always make sufficient atmospheric oxygen available to the bacteria, so that they can effectively breathe organic waste charges and reduce them accordingly. With the method in accordance with the invention, changes in the pH value do not change anything or very little in the decomposition activities of the microorganism culture in the reactor. Under these conditions the microorganism culture can adapt extremely rapidly to changes in concentration and pollutants. The duration of a generation of the microorganisms is approximately one day.

It is essential, that a process computer is connected with means which continuously measure the pH value and the redox potential, as well as with a regulating element continuously regulating the amount of air, and has a memory device, and that the process computer is designed in such a way that it regulates the amount of air supplied to the waste water as a function of the measured redox potential values by guiding the measured pH values in accordance with a preset relationship stored in the memory device. The decomposition conditions in the reactor chamber are continuously set with the aid of this arrangement in such a way, that the microorganism culture encounters optimal atmospheric oxygen conditions, or respectively an optimal redox potential.

The regulating device should preferably be designed in such as way that the redox potential is set with an accuracy of ±20 mV to the optimal redox potential value associated with the actual pH value.

A large advantage of the method in accordance with the invention and the associated arrangement lies in that it is possible to supply the reaction chamber with highly or maximally polluted waste water with great fluctuation ranges of the pH value. The COD concentration can range from 3,000 up to more than 100,000/$O_2$/l. Even at greatly differing pH values, the decomposition of the organic pollutants takes place with unchanging intensity, so that the method in accordance with the invention is distinguished by extraordinary stability. In extreme cases the pH value of the waste water can be between 3 and 12 without substantial neutralizing measures becoming necessary.

BRIEF DESCRIPTION OF THE DRAWINGS

The invention will be explained in more detail in what follows by means of an exemplary embodiment represented in the drawings.

Shown in the drawings are in:

FIG. 2, a characteristic curve illustrating the relationship between pH and redox values for setting optimal decomposition conditions in the waste water at 37° C.

DESCRIPTION OF THE PREFERRED EMBODIMENTS

Figure 1:
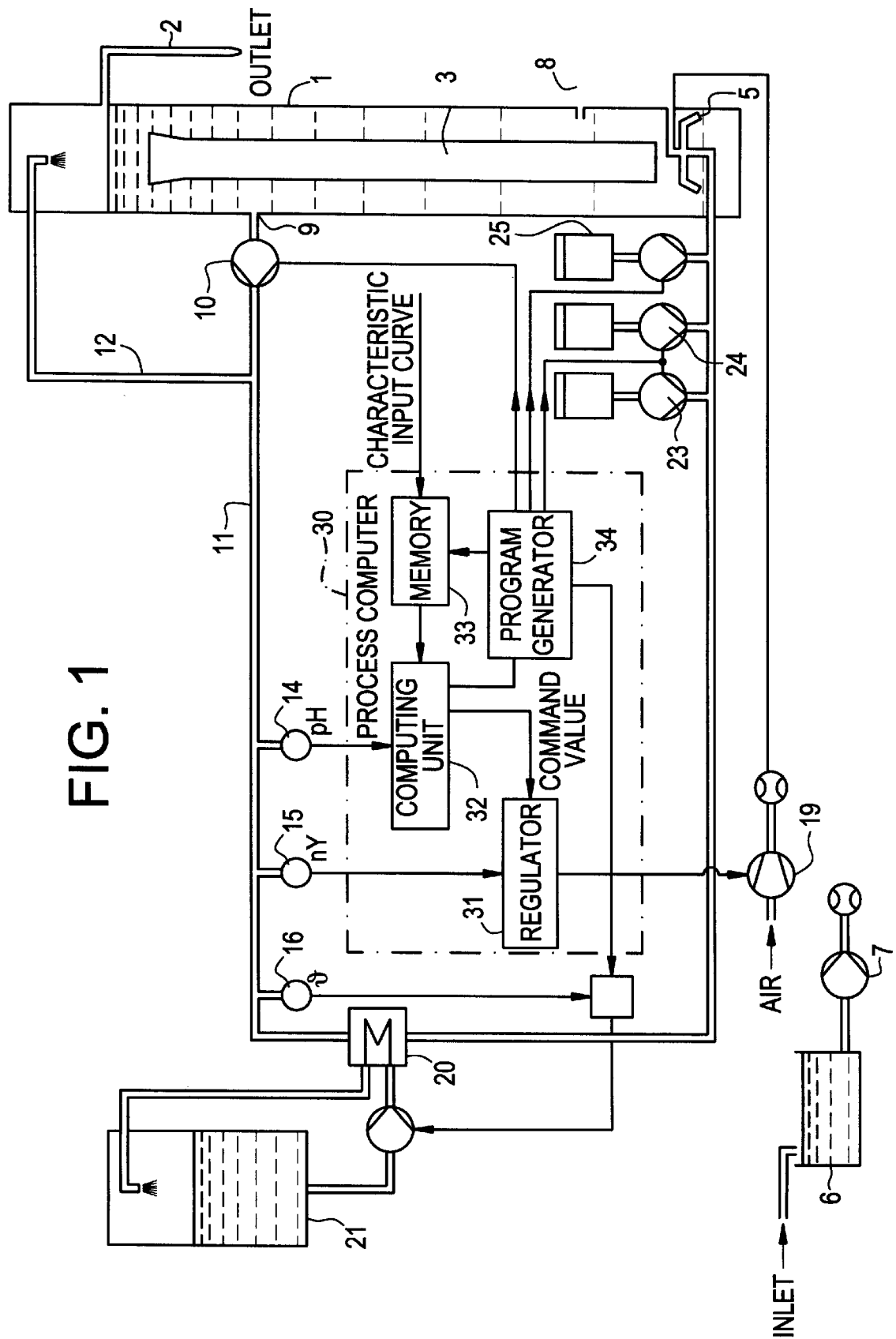
FIG. 1, a basic wiring diagram of the arrangement in accordance with the invention for the decomposition of organic waste water pollutants.

In the exemplary embodiment represented in FIG. 1, the waste water purification takes place in an upright reactor 1. The latter is filled with the waste water to be purified to approximately the height of an outlet 2. An interior pipe 3 with an essentially vertical axis is arranged, spaced apart on all sides, inside the vertical reactor 1. The interior pipe 3 is cylindrical per se, but has an inlet funnel at the upper end. An aeration nozzle arrangement 5 is provided at a distance from the lower end of the interior pipe 3. In a manner to be described further down below, treatment air is injected downward into the waste water to be purified and is essentially evenly distributed by means of the aeration nozzle arrangement 5. The resulting air bubbles rise toward the top, evenly distributed mainly outside of the interior pipe, so that a downward directed flow is created in the interior pipe, which is practically free of bubbles, because of the difference in density. Tests have shown that a flow speed of between 2.5 to 3.5 m/s inside the interior pipe 3 leads to good results. The movement of the water-air mixture below the interior pipe prevents deposits and obstructions in the bottom area of the vertical reactor 1.

The relatively great height of the water level inside the vertical reactor 1 favors the utilization of the oxygen supplied by means of the spray arrangement 5. The oxygen utilization is approximately 55% at a height of 7 m of the column of water. The oxygen utilization is increased to values above 90%, starting with a water columns of approximately 14 m.

The partially aerobic method described by means of FIG. 1 behaves extraordinarily stably. This is above all caused in that the bacteria can be kept individualized and therefore can grow more rapidly than comparable bacteria within activated sludge flocculi. The microorganism population in the vertical reactor 1 can double within a few hours and adapt itself to jumps in concentration or different contained materials. An additional homogenization of the pollutants can be achieved by means of a receiving tank 6 which, however, as the following description will show, is superfluous in many cases. The pollutants to be purified are introduced from the receiving tank 6 by means of a pump 7 and an inlet 8 into the interior of the vertical reactor 1. The inlet 8 terminates in the annular space between the reactor wall and the interior pipe 3.

At a location 9 of the vertical reactor, where the reactor water has a composition representative of the method execution, a partial flow of the waste water is aspirated by a conveying pump 10 into a bypass 11 used for measurement and regulating purposes. Another partial flow is branched off downstream of the recirculating pump 10 and is introduced via tap line 12 into the area above the waste water level in the reactor 1 and is sprayed from there on the water level. Because of this, the prevention of foam formation on the essentially small surface of the vertical reactor is successful to a large extent.

The diverted waste water is passed along several measuring sensors 14, 15 and 16 along the bypass line, is conducted through a heat exchanger 20 of a cooling circuit and, brought to the correct temperature there, if needed, is conducted past metering positions 23 and 24 for neutralizing agents and a feeding station 25 for nutrients into a mixing chamber for mixing with the air from the distributing arrangement 5.

The pH value, or respectively the redox potential value is measured by the measuring sensors 14 and 15. For the partially aerobic method, the optimal pH value lies between the values of 7 and 9. The partially aerobic method constitutes an excellent buffer system and maintains the pH value within the nominal range, even without a supply of neutralizing agents (metering devices 23 and 24). The organic acids are decomposed by the microorganisms, and alkaline substances, such as NaOH are buffered by means of the $CO_2$. A metered addition of neutralizing agents (23 or 24) can become necessary primarily during startup operations or in case of considerable interference with the microorganism population, for example by jolts of poison. However, they are only metered in at extreme pH values, for example less than 3 or more than 12.

Following such poison jolts, the partially aerobic method in accordance with the invention can be continued without having to be inoculated with fresh microorganisms. It is only necessary to maintain the pH value and the temperature in a central range for a short time, and the population of microorganisms will be regenerated within 24 hours.

The essential parameter of the partially aerobic method is the redox potential, which is measured at measuring position 15. The redox potential can be considered to be the measurement of the willingness of the medium to absorb more oxygen. It has been found that an advantageous redox potential value for operating the partially aerobic method lies between −200 and −300 mV. Activated sludge flocculi appear only seldom in this range. In spite of this, a quite active microorganism population can be encountered in the waste water in the interior of the vertical reactor 1. As shown by microscopic examination, this microorganism population consists almost exclusively of bacteria.

It is known that under the proper conditions the pollutants in the waste water are clearly decomposed in the presence of the biomass. The rate of decomposition is a function of the materials contained in it and the waste water concentration. An optimal respiratory output only occurs in high waste water concentrations, for example starting at a COD value of approximately 5000 mg/l.

As stated above, the amount of supplied atmospheric oxygen is changed as a function of the redox potential value measured at the measuring device 15. The invention proceeds from the recognition that there is a mutual interdependence between the pH value and the redox potential value, which must be taken into consideration and maintained when regulating the air supply by means of the metering pump 19. Only in this way is it possible to compensate large fluctuations of the treated waste water in a most simple manner and to assure optimal conditions during continuous operations in the vertical rector 1, together with a high decomposition output.

To this end a process computer 30 is provided in the exemplary embodiment in accordance with FIG. 1, parts of which are a regulator 31, a computing unit 32 and a memory 33 as well as a program generator 34. In the regulator 31 the redox potential value obtained by means of the redox measurement is not merely simply compared with a constant nominal value, but is also brought into a relationship with a command value, which is a function of the actual pH value. In the computing unit 32 the command value is obtained from the pH value with the aid of the characteristic curve stored in the memory 33.

The characteristic curve with the nominal relationship between the pH value and the redox potential value is schematically represented in FIG. 2 of the drawings. In the pH range shown here, the characteristic value is a straight line with an inclination which had previously been determined by tests (in the example, approximately 88 mV per pH at 37° C.). A tolerance field, respectively bordered by dash-dotted lines 41 and 42, is shown on both sides of the characteristic curve 40, in which the microorganism population provides a high decomposition output without harmful side effects. With a too negative redox potential, unsatisfactory decomposition conditions and anaerobic states result, as shown in FIG. 3. On the other side, when the limit 42 is passed, increasing flocculi formation occurs.

It is important that it is provided with the aid of the process computer 30 that the redox potential, and with it the air supply, follow the fluctuating pH values, even in case of strongly fluctuating pH values. In the described example, the correct characteristic curve 40 and, if desired, also the limits 41 and 42, have been entered into the memory 33 before the start of the operation. The memory 33 is programmable.

It is known that with the partially aerobic method the temperature should lie in the range between 20 to 40° C., optimally between 35 and 39° C. With a high COD content of, for example, 10,000 mg/l, the waste water temperature is close to 42° C. The microorganisms are no longer viable at this temperature. In the exemplary embodiment represented in FIG. 1, the waste water can be cooled to a suitable nominal temperature in the bypass 11 by means of the heat exchanger 20. The nominal temperature and the cooling cycle are regulated by the program generator 34, which also sees to the actuation of the metering of the nutrients and the neutralizing agents, when required.

The microorganisms not only require the waste charges for food and the atmospheric oxygen for propagation, but they also have to rely on a number of nutrients. Nitrogen and/or phosphorus are among the latter. Tests have shown that metering in approximately 15 g of nitrogen and/or 5 g of phosphorus per kg of COD to be decomposed leads to advantageous results. In this case metering can be simplified, if the nitrogen is supplied in the form of nitric acid and the phosphorus in the form of phosphoric acid. Part of the nutrients are furthermore trace elements. The latter contain all ions required for the catalytic activity of the enzymes in the form of salts.

The addition of nutrients to the waste water is made in such amounts that the losses of microorganisms caused by dilution are compensated. In the described example, the amount of added nutrients is proportional to the amount of waste water supplied, or respectively the waste charge, measured in COD.

Microorganisms, which can be easily decomposed, are also contained in the waste water, after the waste water has left via the outlet 2. They are either integrated into the sludge in a sewage treatment plant and aid in the decomposition of the remaining COD, or they are eliminated by the filtering devices of the activated sludge, the higher microorganisms.

With the invention it is possible to separate the microorganisms from the presettled waste water. This is possible, for example, by precipitation with iron. In the course of this a comparatively small amount of sludge results. But the advantage of the described method lies in a clearly increased purifying output of more than 90% of the COD.

The method in accordance with the invention has the advantage that it is possible to homogenize highly polluted waste water, with some considerable fluctuations in its composition and in the pH value, which could result in disruptions in a sewage treatment plant, and to purify it in a manner which could not be achieved up to now.

Many variations are possible within the framework of the inventive concept. For example, the aeration nozzles can be differently arranged in the reactor, as long as the downward-directed flow in the interior pipe is maintained. The components of the arrangement can of course also be differently arranged than represented in FIG. 1. The nutrients and neutralizing agents can also be directly added, for example in the inlet. The composition of the nutrients can also be different.

The interdependence of redox potential and pH value can be realized by means of many alternative arrangements. For example, it is possible to omit the computing unit 32 and the separate memory, if the regulator 31 is provided with an adjustable correction device, which converts the actual pH value into the required command value in accordance with the preset characteristic curve rise.

What is claimed is:

1. A method for decomposition of organic waste water pollutants by using freely suspended bacteria, wherein the waste water is recirculated in a reaction chamber and is aerated, the supplied amount of air is regulated in accordance with the treatment requirements of the waste water, and the redox potential and pH values are monitored, comprising the steps of:
   a) determining the redox potential values associated with different pH values, at which the pollutants are optimally biologically decomposed in the reactor;
   b) forming a characteristic curve of redox potential versus pH from the determined values, and storing said values in a process computer;
   c) measuring the pH value and redox potential of the waste water in the reaction chamber, using the measured pH value and the characteristic curve values to determine a command value for redox potential in the process computer and comparing said command value with the measured redox potential value, and d) supplying air to the reaction chamber in an amount sufficient to adjust the redox potential value to the command value for the measured pH value.

2. The method in accordance with claim 1, wherein a portion of the waste water is diverted from the reaction chamber, conducted over a measuring and regulating bypass and returned back into the reaction chamber at a different location, and the pH value and redox potential value of the diverted portion are measured.

3. The method in accordance with claim 2, wherein temperature of the diverted portion is regulated.

4. The method in accordance with claim 3, wherein the waste water in the reaction chamber is maintained at a temperature of between 20 and 40° C.

5. The method in accordance with claim 1, wherein a vertical reactor is used as the reaction chamber, the vertical reactor having a bottom area supplied essentially evenly with the regulated amount of air, which is mixed with the recirculated waste water to be treated.

6. The method in accordance with claim 1, wherein nutrients required for propagation of the microorganisms are admixed with the waste water in a predetermined proportion.

7. The method in accordance with claim 1, wherein the measured pH value is outside of a range between 2 and 12, and neutralizing agents are added.

8. An apparatus for the decomposition of organic waste water pollutants using freely suspended bacteria, wherein the waste water is recirculated in a reaction chamber and is aerated, the supplied amount of air being regulated in accordance with the treatment requirements of the waste water, and the redox potential and pH values are monitored, comprising:

a reaction chamber for the treatment of the waste water charged with pollutants provided in a vertical reactor including means for supplying the waste water to be treated and regulating the supply of air;

means for measuring the pH value and the redox potential value of the treated waste water; and a process computer connected with the means for measuring the pH value and the redox value, and including means for regulating amount of air supplied to the reaction chamber and a memory device;

the process computer regulating the amount of air supplied to the waste water as a function of the measured redox potential values and measured pH values, in accordance with a predetermined relationship stored in the memory.

9. The apparatus in accordance with claim 8, wherein means for measuring the temperature of the treated waste water are provided, and means for adjusting the temperature of the treated waste water are coupled with the process computer.

10. The apparatus in accordance with claim 9, wherein the waste water is recirculated through a bypass line, the bypass line terminates in the vertical reactor in the vicinity of the bottom of the reaction chamber, and means for measuring the pH value, redox potential value and temperature are arranged in the bypass line.

11. The apparatus in accordance with claim 10, wherein nutrient metering means and pH value neutralizing means are connected with the bypass line.

12. The apparatus in accordance with claim 8, wherein a pipe, open at both ends, is vertically installed with spacing on all sides in the vertical reactor, the pipe being widened in the form of a funnel at a top portion.

13. The apparatus in accordance with claim 8, wherein a sprinkling device for destroying foam bubbles is arranged above in an upper portion of the vertical reactor.

* * * * *